Feb. 21, 1950 P. GUAGLIANO 2,498,266
LIQUID CEMENT BRUSH WIPER
Original Filed April 24, 1946 2 Sheets-Sheet 2
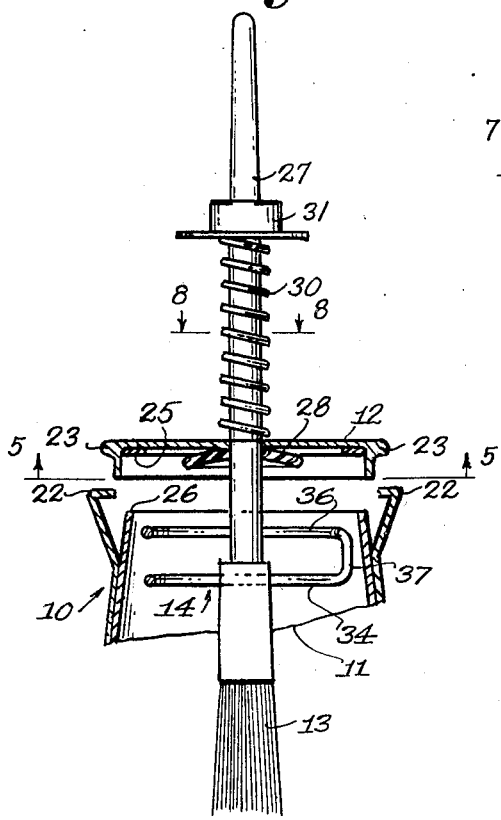
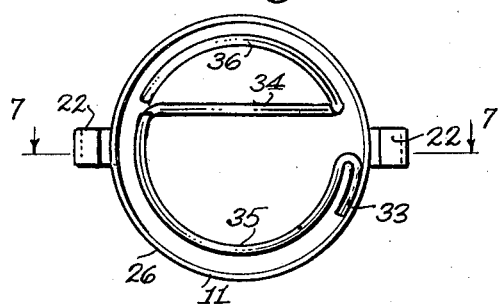
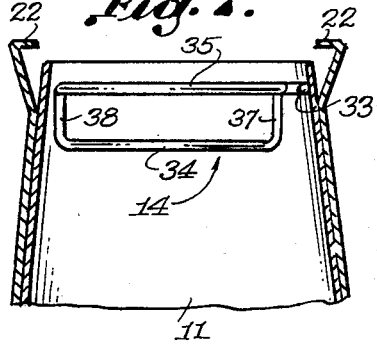
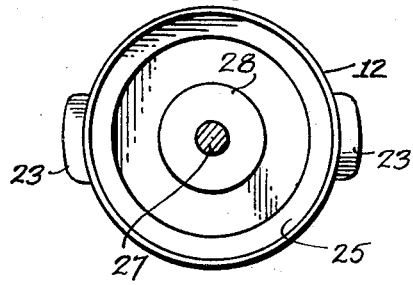
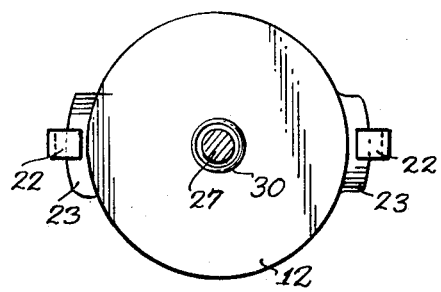
INVENTOR.
PASQUALE GUAGLIANO
BY
Miller & Miller
ATTORNEYS.

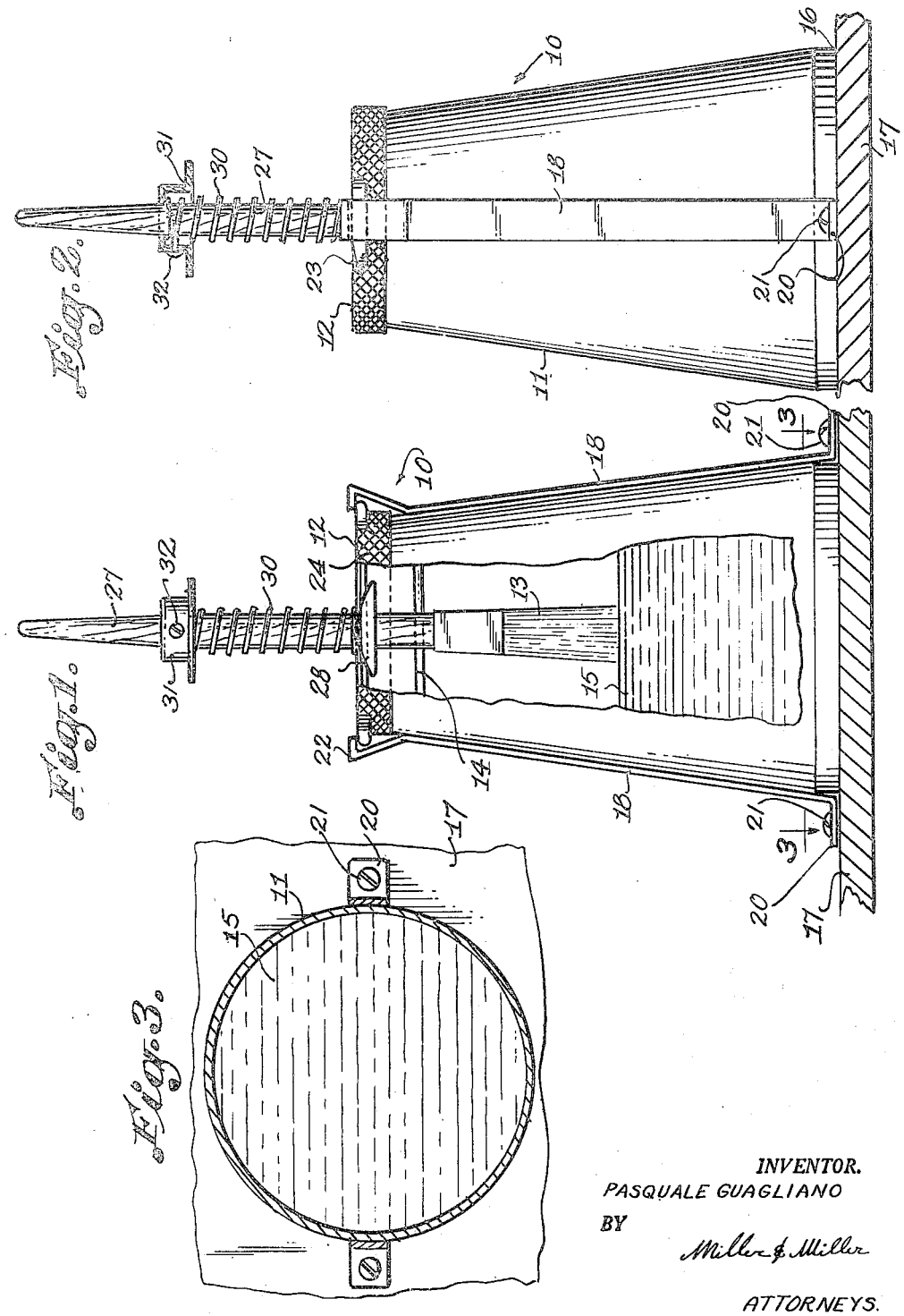

Patented Feb. 21, 1950

2,498,266

UNITED STATES PATENT OFFICE 2,498,266

LIQUID CEMENT BRUSH WIPER

Pasquale Guagliano, Mill Valley, Calif.

Original application April 24, 1946, Serial No. 664,678. Divided and this application June 10, 1947, Serial No. 753,615

1 Claim. (Cl. 220—90)

This application is a division application of Serial No. 664,678, filed April 24, 1946, for Liquid cement brush and container, now Patent Number 2,461,893.

This invention relates to a liquid cement brush, container and wiper and has for an object to provide a combination liquid cement container brush, and wiper for holding liquid cement, or any other liquid which it is desired to hold and to protect against evaporation or against being affected by the air when not in use, which liquid is usually used or applied by means of a brush, to keep the brush in the liquid when not in use, to keep the container safely sealed, to provide improved means for wiping excess liquid from the brush as it is removed therefrom for use, to provide means guarding the container from being accidentally turned over, and yet to make the liquid readily available for instant use whenever needed, while facilitating ready resealing of the brush in the container even for a few moments between successive applications of the liquid by the brush.

Other additional objects will more fully appear from the following description, and that the invention may be more fully understood, reference is had to the accompanying drawing forming a part of the present description and illustrating a preferred embodiment of the invention, in which:

Fig. 1 is a side elevational view, partly broken away, of the brush and container.

Fig. 2 is a similar elevational view, taken at right angles to Fig. 1, with the brush handle spring base in section.

Fig. 3 is a sectional view on line 3—3 of Fig. 1.

Fig. 4 is an elevational view of the brush, with the seal, cover cap and wiper in section.

Fig. 5 is a view on line 5—5 of Fig. 4.

Fig. 6 is a top elevational view of the container and wiper.

Fig. 7 is a sectional view of the top of the container, on line 7—7 of Fig. 6, with the wiper in elevation, and Fig. 8 is a view on line 8—8 of Fig. 4.

There is shown at 10 the liquid cement brush, container, and wiper of this invention including the container 11, its cover cap 12, the brush 13 and the wiper 14. The container 11 is particularly intended for containing liquid cement 15 such as used by a shoemaker, but is equally usable for any other cement or liquid susceptible of spoilage through evaporation or unlimited access to the atmosphere, such as paint, varnish, etc. As shown, the container 11 may be frusto-conical in shape with a broad base 16 for increasing its stability on a supporting table or work-bench surface 17. To absolutely insure against accidental overturn, a pair of straps 18 are soldered or otherwise secured to the outersides of the container 11 and terminate at the bottom in outstanding apertured flanges 20 cooperating with studs 21 for removably securing the container 11 to the surface 17.

The upper ends of the straps 18 terminate in outwardly bent and inwardly extending hooked fingers 22. These hooked fingers 22 are adapted to cooperate with cammed flanges 23 mounted on opposite edges of the cap cover 12, the cap 12 being provided with a knurled edge 24 facilitating removal and replacement of the cap 12 on the container 11. A sealing washer 25, of rubber or of a suitable sealing similar material, is cemented to the inside of the cap 12 to cooperate with the top edge 26 of the container 11 when the cap 12 is held tightly thereagainst by the cammed flanges 23 and the hooked finger 22.

Extending through an aperture in the center of the cap 12 is the handle 27 of the brush 13. This cap aperture is adapted to be sealed by a washer 28 made of rubber or of other suitable somewhat resilient sealing material and fitted tightly about the handle 27 by its natural resiliency. Due to the aperture in the washer 28 being smaller than the diameter of the handle 27 the washer shapes itself to a somewhat dome shape. A coil spring 30 extending about the handle 27 on top of the cap 12 and based against a hat-shaped anchor 31 serves to hold the brush 13 away from the bottom of the container and at the same time to hold the washer in tight sealing contact against the inside of the cap 12, thus preventing evaporation through the handle aperture in the cap 12. This spring anchor 31 is secured by a screw 32 to the brush handle 27.

The brush wiper 14, of any suitable cross-section, is somewhat S-shaped when viewed in top elevation, and is soldered or otherwise secured as at 33 to the inside of the container 11 near its top edge 26. An important detail of the wiper 14 is that its middle or chordal bar 34 is both curved away from the axial center of the container 11 and is at a lower elevation than the two curved end bars arcs 35 and 36, being secured thereto by depending legs 37 and 38. The wiper 14 is made up from a thin rod bent and curved to the shape shown and just described. By having the middle chordal bar spaced from the axial center, the brush 13 and its handle 27 is free to occupy such axial center. However, as the brush is removed, it may be wiped first against the middle and hence lower bar 34 and then against one of the upper curved end bars, preferably the more adjacent curved bar 36, thus reducing the contents of the brush 13 to a non-dripping amount of liquid.

In operation, the container 11 may be kept permanently, yet removably secured to the table or work bench surface 17 located adjacent the operator. The liquid 15 is replenished from time to time from the original container in which it may have been purchased. The cap 12 is held in sealing contact on container 11 by means of the hooked fingers 22 cooperating with the cammed fingers 23. When the brush 13 is to be used, the handle 27 is first depressed pushing the brush 13 into the liquid 15, the spring 30 yielding to permit such action, then the cap 12 is grasped by the knurled side 24, and it is rotated to remove the cammed flanges 23 from beneath the hooked fingers 22, permitting the brush 13 to be removed from the container 11, carrying the cap 12 with it at all times. As the brush 13 is removed, it is wiped twice against the wiper 14, first against the lower middle wiper bar 34 and then against the upper wiper bar 35, the drippings falling back into the liquid 15 immediately, thus not being wasted. At the same time, the brush is just wetted enough by the liquid for satisfactory use.

While I have shown one embodiment of my invention, I do not wish to be limited to the specific details thereof, but desire to be protected in the various changes, alterations and modifications which I may make within the scope of the appended claim.

Having thus set forth and disclosed the nature of this invention, what is claimed is:

A brush cooperating double action wiper means adapted to be mounted within a container, said means consisting of a single longitudinal member shaped into a somewhat S-shaped member having a large arc and a small arc forming parts of a complete circle, said arcs being in a single plane, a chordal bar in a depressed plane relative to said arcs, and vertical legs connecting said chordal bar to said arcs at one end only of each of said arcs, the other end of said small arc being free and the other end of said large arc being bent outwardly of said circle and providing a container securing member, for attachment to an inner surface of the container with said arcs and chordal bar spaced from such inner container surface, whereby a brush may be wiped first on said chordal bar and then on one of said arcs in a single withdrawing action from the container.

PASQUALE GUAGLIANO.

REFERENCES CITED

The following references are of record in the file of this patent:

UNITED STATES PATENTS

| Number | Name | Date |
|---|---|---|
| 597,350 | Anschutz | Jan. 11, 1898 |
| 1,547,541 | Wansner | July 28, 1925 |
| 1,553,705 | Maxedon | Sept. 15, 1925 |
| 2,094,179 | Milarch | Sept. 28, 1937 |
| 2,275,305 | Morgan | Mar. 3, 1942 |
| 2,342,454 | Coyliondro | Feb. 22, 1944 |